United States Patent
Ikeda (10) Patent No.: US 6,823,304 B2
(45) Date of Patent: Nov. 23, 2004

(54) SPEECH RECOGNITION APPARATUS AND METHOD PERFORMING SPEECH RECOGNITION WITH FEATURE PARAMETER PRECEDING LEAD VOICED SOUND AS FEATURE PARAMETER OF LEAD CONSONANT

(75) Inventor: Masahiko Ikeda, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 691 days.

(21) Appl. No.: 09/908,517

(22) Filed: Jul. 19, 2001

(65) Prior Publication Data

US 2002/0111802 A1 Aug. 15, 2002

(30) Foreign Application Priority Data

Dec. 20, 2000 (JP) .......................................... 2000-387226

(51) Int. Cl.[7] .............................................. G10L 15/02
(52) U.S. Cl. ....................... 704/231; 704/236; 704/238; 704/243; 704/256
(58) Field of Search ................................. 704/231, 236, 704/238, 239, 243, 246, 256

(56) References Cited

U.S. PATENT DOCUMENTS 5,649,056 A * 7/1997 Nitta ............................ 704/256

FOREIGN PATENT DOCUMENTS

JP 09-068995 3/1997

OTHER PUBLICATIONS

Steven F. Boll, "Suppression Of Acoustic Noise in Speech Using Spectral Subtraction," IEEE Transactions on Acoustics, Speech, and Signal Processing, vol. ASSP–27, No. 2, Apr. 1979, pp. 113–120.

* cited by examiner

Primary Examiner—Susan McFadden
(74) Attorney, Agent, or Firm—McDermott Will & Emery LLP (57) ABSTRACT

A lead consonant buffer stores a feature parameter preceding a lead voiced sound detected by a voiced sound detector as a feature parameter of a lead consonant. A matching processing unit performs matching processing of a feature parameter of a lead consonant stored in the lead consonant buffer with a feature parameter of a registered pattern. Hence, the matching processing unit can perform matching processing reflecting information on a lead consonant even when no lead consonant can be detected due to a noise.

17 Claims, 10 Drawing Sheets

FIG. 1 PRIOR ART

*FIG.2A*
PRIOR ART   SPEECH OF GOOD S/N RATIO

LEAD CONSONANT INTERVAL
SPEECH INTERVAL

*FIG.2B*
PRIOR ART   SPEECH OF BAD S/N RATIO

DETECTABLE RANGE

|  | CONSONANT 1 | CONSONANT 2 | ... |
|---|---|---|---|
| VOICED SOUND 1 | 25 | 4 | ... |
| VOICED SOUND 2 | 2 | 0 | ... |
| ⋮ | ⋮ | ⋮ | ⋱ |

SPEECH RECOGNITION APPARATUS AND METHOD PERFORMING SPEECH RECOGNITION WITH FEATURE PARAMETER PRECEDING LEAD VOICED SOUND AS FEATURE PARAMETER OF LEAD CONSONANT

BACKGROUND OF THE INVENTION

1. Field of the Invention

The present invention relates to a speech recognition technique using a DP (Dynamic Programming) matching method, a HMM (Hidden Markov Model) method or the like, and more particularly, to a speech recognition apparatus and a speech recognition method with recognition accuracy improved by correctly detecting a consonant at a leading position (hereinafter referred to a lead consonant) of a speech.

2. Description of the Background Art

In recent years, enthusiastic development of a speech recognition apparatus has been seen in information processing system such as a personal computer, a word processor and others in order to enable text input or the like with a speech. In a conventional speech recognition apparatus, well used are speech recognition techniques such as a DP matching method in which a variation in word spoken rate is effectively absorbed by application of pattern matching through non-linear expanding/shrinking of the time axis and a HMM method by which high recognition accuracy can be attained even against variations in voice spectrum caused by an individual difference of a speaker.

Figure 1:
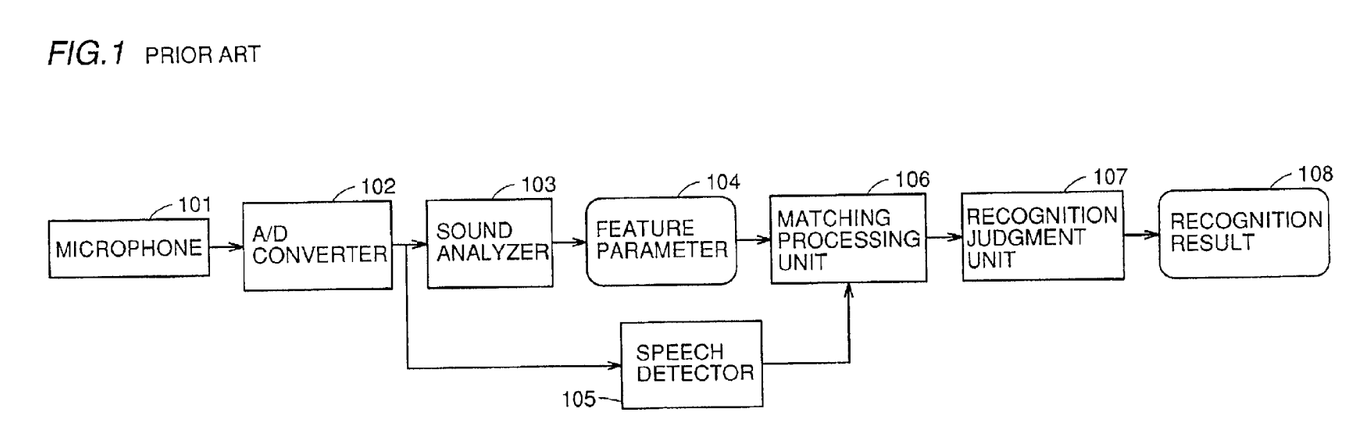
FIG. 1 is a block diagram representing a schematic configuration of a conventional speech recognition apparatus.

FIG. 1 is a block diagram representing the schematic configuration of a conventional speech recognition apparatus. The speech recognition apparatus includes: a microphone 101 converting a speech of a speaker to an analog, electrical signal; an A/D (Analog/Digital) converter 102 converting an analog signal outputted from the microphone 101 to sound data of digital information; a sound analyzer 103 analyzing the sound data outputted from the A/D converter 102 to convert it to a feature parameter 104; an speech detector 105 detecting an interval of the speech using the sound data outputted from the A/D converter 102; a matching processing unit 106 performing matching processing of a feature parameter 104 with registered data based on a detection result obtained by the speech detector 105; and a recognition judgment unit 107 performing judgment on recognition based on a matching result obtained by the matching processing unit 106 to output a recognition result 108.

Feature parameters adopted here are as follows: power, Δ power, LPC (Linear Predictive Coding) cepstrum, LPC Δ cepstrum and others.

The speech detector 105 calculates sound power through operation of the following equation based on the sound data and judges an interval in which sound power exceeds a prescribed threshold value as a speech interval:

$$P = \sum_{i=0}^{N} x_i^2 \quad (1)$$

where $x_i$ is an amplitude value of an ith sound in a frame and N is the number of samples in one frame.

Figure 2A:
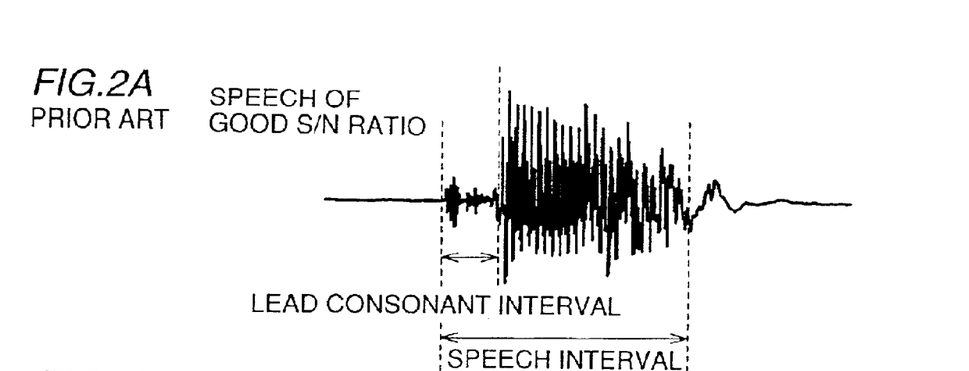
FIGS. 2A and 2B are drawings for explaining of the problem in an interval detection method realized by a conventional speech recognition apparatus.

In a case where no noise is mixed into a speech as shown in FIG. 2A in the above described speech interval detection method, it is possible to correctly detect a lead consonant interval of the speech from the sound data. The recognition judgment unit 107 can output a correct recognition result of a speech interval.

Figure 2B:
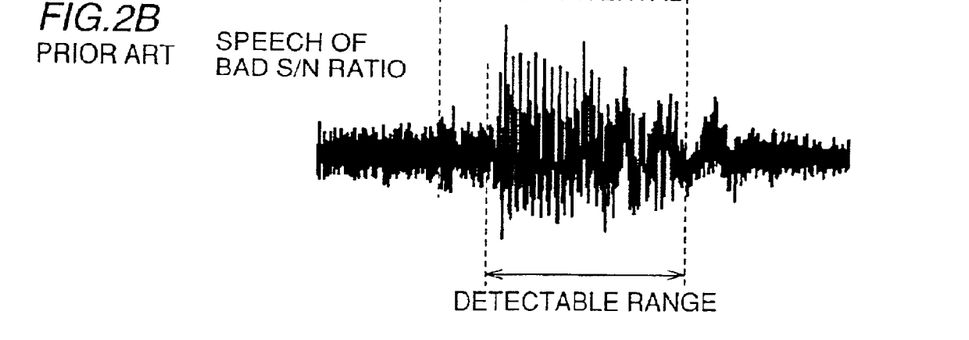

However, in a case where S/N ratios of the microphone 101 and others are bad and noises are mixed into a speech as shown in FIG. 2B, the lead consonant interval of a speech is embedded in the noises. The sound data results in lacking information on a lead consonant component and thereby the recognition judgment unit 107 has an output of a limited recognition result in a detectable range.

Furthermore, a method can be adopted in which like a spectral subtraction technique, information on frequencies of noises are detected in advance to calculate an average thereof and subtraction is performed of the average from each speech frame, followed by detection of a lead consonant interval. This method, however, has problems because of increasing an operational volume to negate high speed processing and since an adverse influence has a chance to be exerted on waveforms themselves of a speech to be analyzed in an environment of high noise levels, thereby disabling correct speech recognition.

SUMMARY OF THE INVENTION

It is accordingly an object of the present invention is to provide a speech recognition apparatus and a speech recognition method capable of causing matching processing to reflect information on a lead consonant component even when the lead consonant cannot be detected due to a noise.

It is another object of the present invention to provided a speech recognition apparatus and a speech recognition method capable of solving a deviation of a start edge position in the matching processing.

It is still another object of the present invention to provide a speech recognition apparatus and a speech recognition method in which a speech recognition speed is increased by reducing the number of matching processing times.

It is a further object of the present invention to provide a speech recognition apparatus and a speech recognition method capable of outputting a recognition result with high possibility even when no correct recognition result is attained.

According to an aspect of the present invention, a speech recognition apparatus includes: a sound analyzer converting sound data to a feature parameter; a voiced sound detector detecting a voiced sound component at a leading position (hereinafter referred to as a lead voiced sound) from the sound data; a lead consonant buffer storing a feature parameter preceding a lead voiced sound detected by the voiced sound detector as a feature parameter of a lead consonant therein; and a recognition processing section performing recognition processing referring to the feature parameter of the lead consonant stored in the lead consonant buffer.

Since the feature parameter preceding a lead voiced sound detected by the voiced sound detector is stored in the lead consonant buffer as a feature parameter of a lead consonant, recognition processing reflecting information on a lead consonant can be performed even when the lead consonant is not detected due to a noise.

According to another aspect of the present invention, a speech recognition method includes the steps of: converting sound data to a feature parameter; detecting a lead voiced sound from the sound data; storing a feature parameter preceding the lead voiced sound detected as a feature parameter of a lead consonant; and performing recognition processing referring to the feature parameter of a lead consonant stored.

Since a feature parameter preceding a lead voiced sound detected is stored as a feature parameter of a lead consonant, matching processing reflecting information on the lead consonant can be performed even when the lead consonant is not detected due to a noise.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 3:
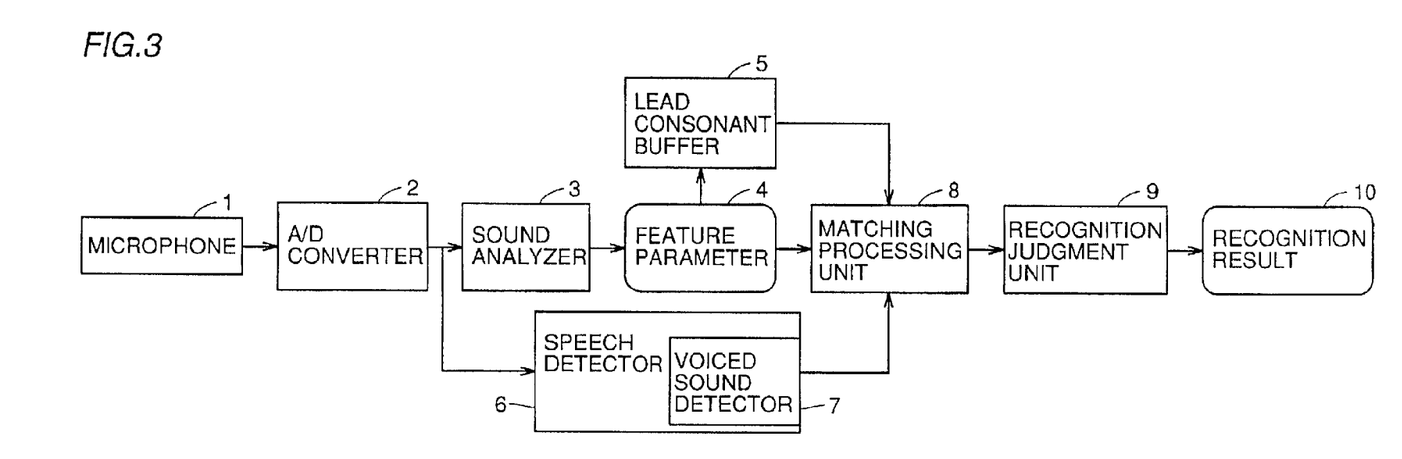
FIG. 3 is a block diagram representing a schematic configuration of a speech recognition apparatus in a first embodiment of the present invention.

FIG. 3 a block diagram representing a schematic configuration of a speech recognition apparatus in the first embodiment of the present invention. The speech recognition apparatus includes: a microphone 1 converting a speech of a speaker to an analog, electrical signal; an A/D converter 2 converting the analog signal outputted from the microphone 1 to sound data of digital information; a sound analyzer 3 analyzing the sound data outputted from the A/D converter 2 to convert it to a feature parameter 4; a lead consonant buffer 5 storing feature parameters for a fixed number of frames corresponding to a lead consonant of a speech; an speech detector 6 detecting a speech interval using the sound data outputted from the A/D converter 2; a matching processing unit 8 performing matching processing of a feature parameter of a lead consonant stored in the lead consonant buffer 5 and a feature parameter 4 subsequent to a lead voiced sound with registered data; and a recognition judgment unit 9 performing judgment on recognition based on a matching result obtained by the matching processing unit 8 to output a recognition result 10.

The speech detector 6 includes a voiced sound detector 7 detecting a voiced sound component of a speech using sound data outputted from the A/D converter 2. The voiced sound detector 7 detects a voiced sound component using a pitch extraction method such as a modified correlation method and a cepstrum method.

The sound analyzer 3 analyzes sound data outputted from the AID converter 2 to convert the data to feature parameters 4 of respective frames with each frame (X samples at Y intervals) as a unit. The lead consonant buffer 5 is a buffer of a FIFO (First In First Out) type and has a capacity as large as to be able to store feature parameters of a fixed number of frames (hereinafter referred to as F frames) secured as a lead consonant.

When a lead voiced sound is detected by the voiced sound detector 7, then feature parameters of F frames stored in the lead consonant buffer 5 is regarded as feature parameters of a lead consonant interval. The matching processing unit 8 performs matching processing of the feature parameters of the lead consonant interval stored in the lead consonant buffer 5 with registered data and in succession, performs matching processing of a feature parameter 4 after a voiced sound component was detected by the voiced sound detector 7 with a registered data. Furthermore, the matching processing unit 8 continues to perform matching processings till it is judged that a speech interval comes to its end by the speech detector 6.

The recognition judgment unit 9 performs recognition of a speech based on a matching result outputted from the matching processing unit 8 to output a recognition result 10.

Figure 4:
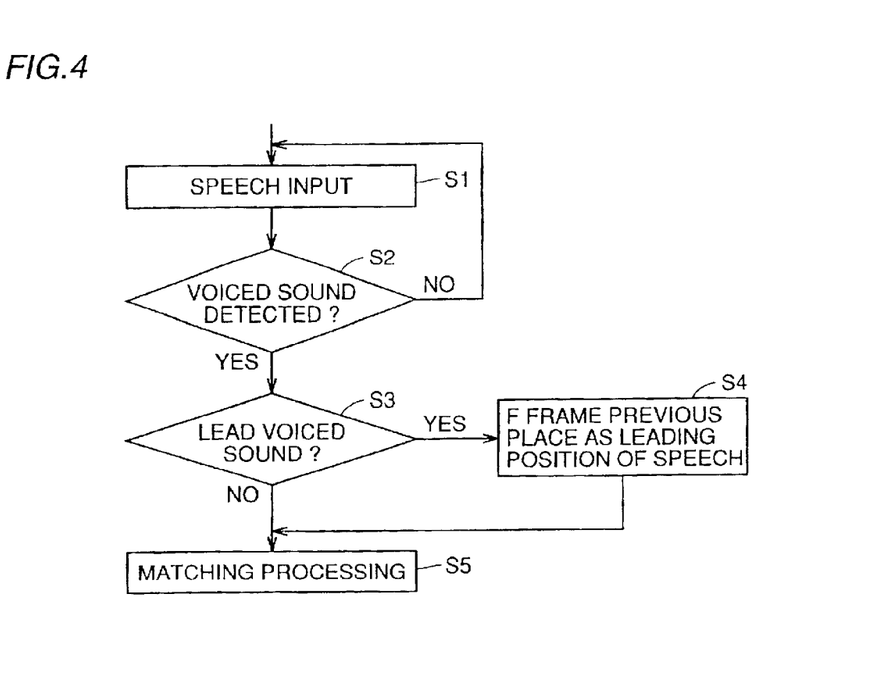
FIG. 4 is a flow chart for explaining a process procedure of the speech recognition apparatus in a first embodiment of the present invention.

FIG. 4 is a flow chart for explaining a process procedure of the speech recognition apparatus according to the present embodiment. First, when a speaker inputs a speech through the microphone 1 (S1), the speech is determined on whether or not it is a voiced sound by the voiced sound detector 7 (S2). If no voiced sound is detected by the voiced sound detector 7 (S2, No), then the processing returns to step S1 and speech inputting is repeated.

Contrary to this, if a voiced sound is detected by the voiced sound detector 7 (S2, Yes), then it is determined whether or not the voiced sound is a lead voiced sound (S3). If the voiced sound is a lead voiced sound (S3, Yes), then a leading position of the speech is assumed to be at a F frame previous place, that is a leading position of the speech is assumed to be a leading position of feature parameters of F frames stored in the lead consonant buffer 5 (S4) and the processing advances to step S5. To the contrary, if the voiced sound is not a lead voiced sound (S3, No), the processing also advances to step S5.

In step S5, the matching processing unit 8 continues to perform matching processing till coming to the end of a speech interval is judged by the speech detector 6. Moreover, the process procedure of FIG. 4 shows a case of word recognition and the recognition judgment unit 9 outputs a word candidate as a recognition result 10.

Figure 5:
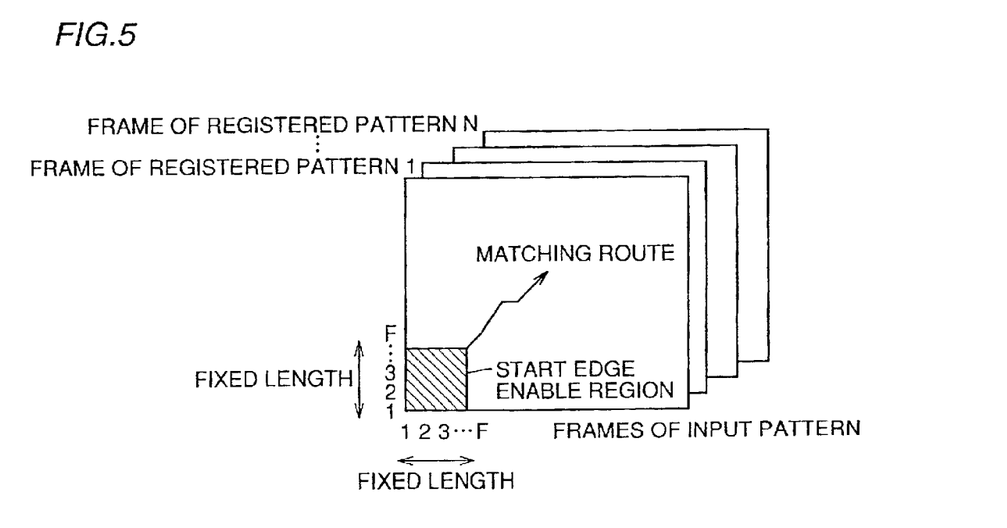
FIG. 5 is a drawing for explaining matching processing in the first embodiment of the present invention.

FIG. 5 is a drawing for explaining matching processing according to the present embodiment. While as described above, the parameters of F frames preceding a lead voiced sound are used as a feature parameter of a lead consonant, there is a change in length of a consonant of a speaker; therefore, a necessity arises to determine the best start edge candidate for each frame. Now, feature parameters of the F frames are indicated by 1, 2, 3, . . . , F, respectively, in this order starting at the leading position. Besides, it is assumed that feature parameters of a inputted speech is an input pattern and that registered feature parameters are a registered pattern.

The matching processing unit 8 determines the best start edge candidate in each frame (1, 2, 3, ..., F) of the input pattern in a start edge enable region shown in FIG. 5. While the F frames are sequentially processed, the best start edge candidate among those before and including a current frame in process is determined such that the best start edge candidate before and including the current frame is the best as compared with the best start edge candidate for the previous frame. That is, matching processing is sequentially performed on $F^2$ combinations of start edge candidates in the start edge enable region shown in FIG. 5 and the best start candidate is finally determined among the start edge candidates. The number of registered patterns is N and the best start edge candidate is determined for each of the registered patterns. Furthermore, the matching processing unit 8 outputs a matching result on a determined best start edge candidate of each of the registered patterns to the recognition judgment unit 9. The recognition judgment unit 9 determines a registered pattern best matching with an input pattern among the N registered patterns based on respective matching results.

Note that the sound analyzer 3, the speech detector 6, the voiced sound detector 7, the matching processing unit 8 and the recognition judgment unit 9 can be realized by executing computer programs with a computer. The computer programs are provided to a user with a storage medium having the programs stored therein and a general purpose use computer executes the programs stored in a storage medium, whereby speech recognition is performed according to the above described process procedure.

According to a speech recognition apparatus in the present embodiment, as described above, a lead voiced sound is detected, matching processing is performed on a fixed number of frames preceding the lead voiced sound as lead consonants; therefore, matching processing can reflect information on a lead consonant even when no lead consonant is detected due to noises, thereby, enabling accuracy of speech recognition to improve. Moreover, since the best start edge candidate is determined in a start edge enable region, a deviation in start edge is solved, which can further improve accuracy of speech recognition.

Second Embodiment

Figure 6:
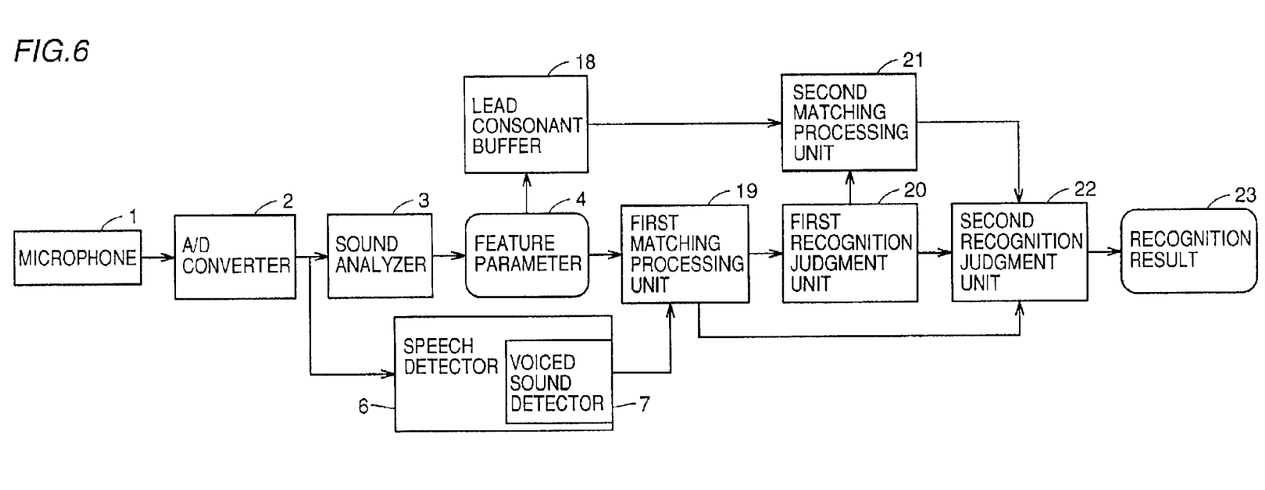
FIG. 6 is a block diagram representing a schematic configuration of a speech recognition apparatus in a second embodiment of the present invention.

FIG. 6 is a block diagram representing a schematic configuration of a speech recognition apparatus in the second embodiment of the present invention. The speech recognition apparatus includes: a microphone 1 converting a speech of a speaker to an analog, electrical signal; an A/D converter 2 converting the analog signal outputted from the microphone 1 to sound data of digital information; a sound analyzer 3 analyzing the sound data outputted from the A/D converter 2 to convert it to a feature parameter 4; an speech detector 6 detecting a speech interval using sound data outputted from the A/D converter 2; a lead consonant buffer 18 storing feature parameters of frames equal to or longer than the longest lead consonant of a registered pattern; a first matching processing unit 19 performing matching processing of a feature parameter 4 subsequent to a lead voiced sound with registered data based on a detection result obtained by the speech detector 6; a first recognition judgment unit 20 performing recognition judgment on sound data subsequent to a voiced sound based on a matching result obtained by the first matching processing unit 19; a second matching processing unit 21 performing matching processing of feature parameters stored in the lead consonant buffer 18 with the registered data in the upper n places among recognition results obtained by the first recognition judgment unit 20; and a second recognition judgment unit 22 summing a judgment result obtained by the first recognition judgment unit 20 and a matching result obtained by the second matching processor 21 after being weighted to perform judgment on recognition and output a recognition result 23.

The speech detector 6 includes a voiced sound detector 7 detecting a voiced sound component of a speech using sound data outputted from the A/C converter 2. The voiced sound detector 7 detects a voiced sound using a pitch extraction method such as a modified correlation method and a cepstrum method.

The sound analyzer 3 analyzes sound data outputted from the A/D converter 2 to convert frames of the sound data to respective feature parameters 4 with each frame as a unit. The lead consonant buffer 18 is a buffer of a FIFO type and has a capacity as large as to be able to store feature parameters of frames equal to or longer than the longest lead consonant of a registered pattern.

The second matching processing unit 21 regards feature parameters of lead consonants stored in the lead consonant buffer 18 and feature parameters subsequent to a lead voiced sound as an input pattern to perform matching processing of the input pattern with the registered data in the upper n places among recognition results obtained by the first recognition judgment unit 20. Note that the second matching processing unit 21 may perform only matching processing of the feature parameters of lead consonants stored in the lead consonant buffer 18 with a registered pattern of lead consonants.

When a lead voiced sound is detected by the voiced sound detector 7, the first matching processing unit 19 performs only matching processing of a feature parameter subsequent to a lead voiced sound with a feature parameter of a registered pattern. The first recognition judgment unite 20 judges the upper n (N>n) candidates of N registered patterns based on matching results to output a recognition result.

The second matching processing unit 21 performs matching processing of a feature parameter in a lead consonant interval stored in the lead consonant buffer 18 and a feature parameter 4 subsequent to a lead voiced sound with registered data corresponding to the upper n candidates outputted from the first recognition judgment unit 20. The second recognition judgment unit 22 sums a judgment result obtained by the first recognition judgment unit 20 and a matching result obtained by the second matching processing unit 21 after being weighted to perform judgment on recognition and output a recognition result 23.

Figure 7:
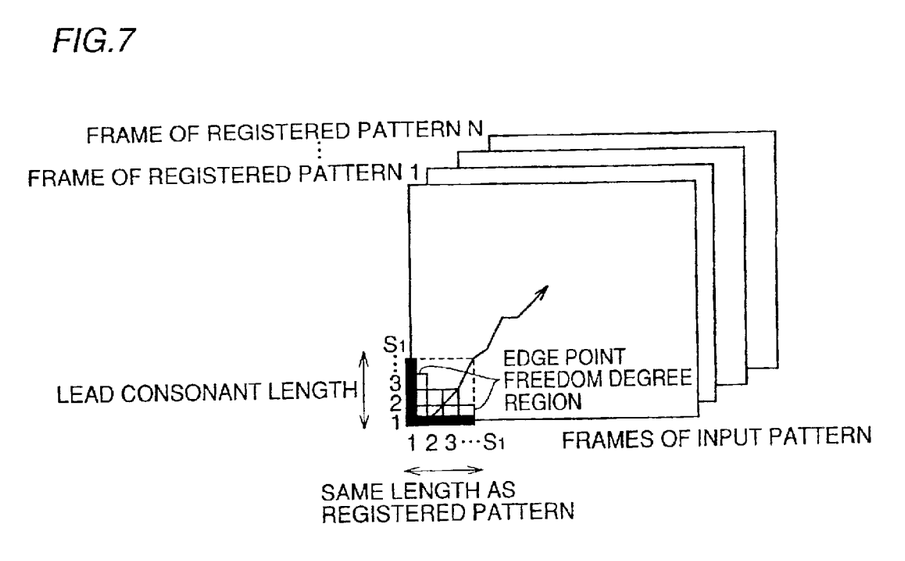
FIG. 7 is a drawing for explaining matching processing in the second embodiment of the present invention.

FIG. 7 is a drawing for explaining matching processing in the present embodiment. While as described above, feature parameters of frames equal to or longer than the longest lead consonant of a registered pattern are stored in the lead consonant buffer 18, when the second matching processor 21 performs matching processing, frames in length equal to a lead consonant length ($S_1$ frame) of a registered pattern corresponding to the upper n candidates are used. That is, used are only feature parameters of the S1 frame stored later among feature parameters stored in the lead consonant buffer 18.

The second matching processing unit 21 performs matching processing starting at a start edge in a edge point freedom degree region shown in FIG. 7 to determine the best start edge candidate. Since in such a way, used are only feature parameters of the same length as a lead consonant length of a registered pattern, the number of start edge candidates can be reduced.

Note that the sound analyzer 3, the speech detector 6, the voiced sound detector 7, the first matching processing unit 19, the first recognition judgment unit 20, the second matching processing unit 21 and the second recognition judgment unit 22 can also be realized by executing computer programs with a processor. The computer programs are provided to a user with a storage medium having the programs stored therein and speech recognition is performed according to the above described procedure by executing the programs with a general purpose use computer.

According to a speech recognition apparatus in the present embodiment, as described above, a lead voiced sound is detected and matching processing is performed of a feature parameter subsequent to a lead voiced sound with a feature parameters of a registered pattern to extract the upper n candidates. The number of registered patterns on which matching processing of a lead consonant is performed can be reduced and a processing load can be further reduced compared with the speech recognition apparatus in the first embodiment.

Furthermore, the second recognition judgment unit 22 sums a judgment result obtained by the first recognition judgment unit 20 and a matching result obtained by the second matching processing unite 21 after being weighted to perform judgment on recognition. Even when S/N ratios of the microphone 1 and others are bad and therefore almost no information on a lead consonant is detected, accuracy of recognition can be improved.

Moreover, since used are only feature parameters in length equal to a lead consonant length of a registered pattern among feature parameters stored in the lead consonant buffer 18, the number of start edge candidates can be reduced and a processing load can be further decreased compared with the speech recognition apparatus of the first embodiment.

Third Embodiment

Figure 8:
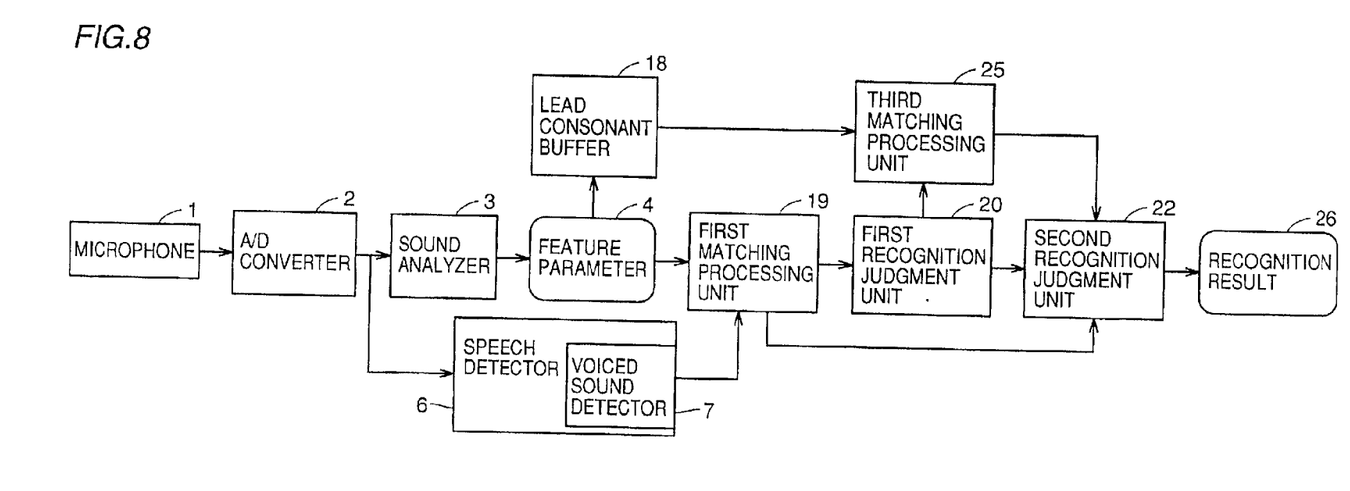
FIG. 8 is a block diagram representing a schematic configuration of a speech recognition apparatus in a third embodiment of the present invention.

FIG. 8 is a block diagram representing a schematic configuration of a speech recognition apparatus in the third embodiment of the present invention. The speech recognition apparatus includes: a microphone 1 converting a speech of a speaker to an analog, electrical signal; an A/D converter 2 converting the analog signal outputted from the microphone 1 to sound data of digital information; a sound analyzer 3 analyzing the sound data outputted from the A/D converter 2 to convert it to a feature parameter 4; an speech detector 6 detecting an interval of a speech using the sound data outputted from the A/D converter 2; a lead consonant buffer 18 storing feature parameters of frames equal to or longer than the longest lead consonant of a registered pattern; a first matching processing unit 19 performing matching processing of a feature parameter 4 subsequent to a lead voiced sound with registered data based on a detection result obtained by the speech detector 6; a first recognition judgment unit 20 performing recognition judgment on sound data subsequent to a lead voiced sound based on a matching result obtained by the first matching processor 19; a third matching processing unit 25 performing matching processing of a feature parameter of a lead consonant stored in the lead consonant buffer 18 with the upper n registered data among recognition results obtained by the first recognition judgment unit 20 in a retroactive direction; and a second recognition judgment unit 22 summing a judgment result obtained by the first recognition judgment unit 20 and a matching result obtained by the third matching processing unit 25 after being weighted to perform judgment on recognition and output a recognition result 26.

The speech detector 6 includes a voiced sound detector 7 detecting a voiced sound component of a speech using sound data outputted from the A/C converter 2. The voiced sound detector 7 detects a voiced sound using a pitch extraction method such as a modified correlation method and a cepstrum method.

The sound analyzer 3 analyzes sound data outputted from the A/D converter 2 to convert frames of the sound data to respective feature parameters 4 with each frame as a unit. The lead consonant buffer 18 has a capacity as large as to be able to store feature parameters of frames equal to or longer than the longest lead consonant of a registered pattern.

The third matching processing unit 25 performs matching processing of a feature parameter of a lead consonant stored in the lead consonant buffer 18 with the upper n registered data among recognition results obtained by the first recognition judgment unit 20 in a reverse direction on a time series (in a retroactive direction).

When a lead voiced sound is detected by the voiced sound detector 7, the first matching processing unit 19 performs only matching processing of a feature parameter 4 subsequent to a lead voiced sound with a feature parameter of a registered pattern. The first recognition judgment unit 20 judges the upper n candidates of N registered patterns based on matching results subsequent to a lead voiced sound outputted from the first matching processing unit 19 to output a recognition result.

The third matching processing unit 25 performs matching processing of feature parameters in a lead consonant interval stored in the lead consonant buffer 18 with registered data in a reverse direction on a time series. The second recognition judgment unit 22 sums a judgment result obtained by the first recognition judgment unit 20 and a matching result obtained by the third matching processor 25 after being weighted to perform judgment on recognition and output a recognition result 26.

Figure 9:
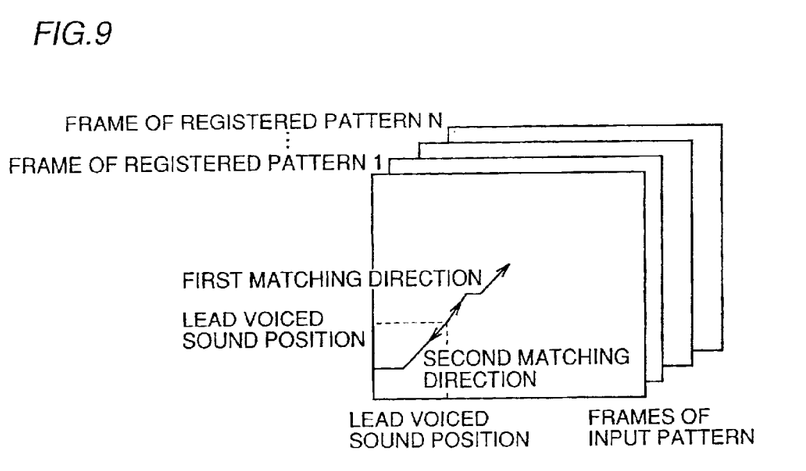
FIG. 9 is a drawing for explaining matching processing in the third embodiment of the present invention.

FIG. 9 is a drawing for explaining matching processing in the present embodiment. While as described above, feature parameters equal to or longer than the longest lead consonant of a registered pattern are stored in the lead consonant buffer 18, the number of frames used in the matching processing is altered according to a registered pattern since the third matching processing unit 25 performs matching processing in a reverse direction on a time series.

The first matching processing unit 19 performs matching processing in a first matching direction starting at a lead voiced sound position shown in FIG. 9. Furthermore, the third matching processing unit 25 performs matching processing in a second matching direction starting at a lead voiced sound position shown in FIG. 9. Hence, no necessity arises to determine the best start edge candidate in the present embodiment while either of the first embodiment and the second embodiment requires the determination of the best start edge candidate.

Note that the sound analyzer 3, the speech detector 6, the voiced sound detector 7, the first matching processing unit 19, the first recognition judgment unit 20, the second recognition judgment unit 22 and the third matching processing unit 25 can also be realized by executing computer programs with a processor. The computer programs are provided to a user with a storage medium having the programs stored therein and speech recognition is performed according to the above described procedure by executing the programs with a general purpose use computer.

According to the speech recognition apparatus in the present embodiment, as described above, in addition to the effect exerted by the speech recognition apparatus in the second embodiment, the third matching processing unit 25 performs matching processing in a reverse direction on a time series. No necessity arises to determine the best start edge candidate, thereby enabling a processing load to further decrease.

Fourth Embodiment

Figure 10:
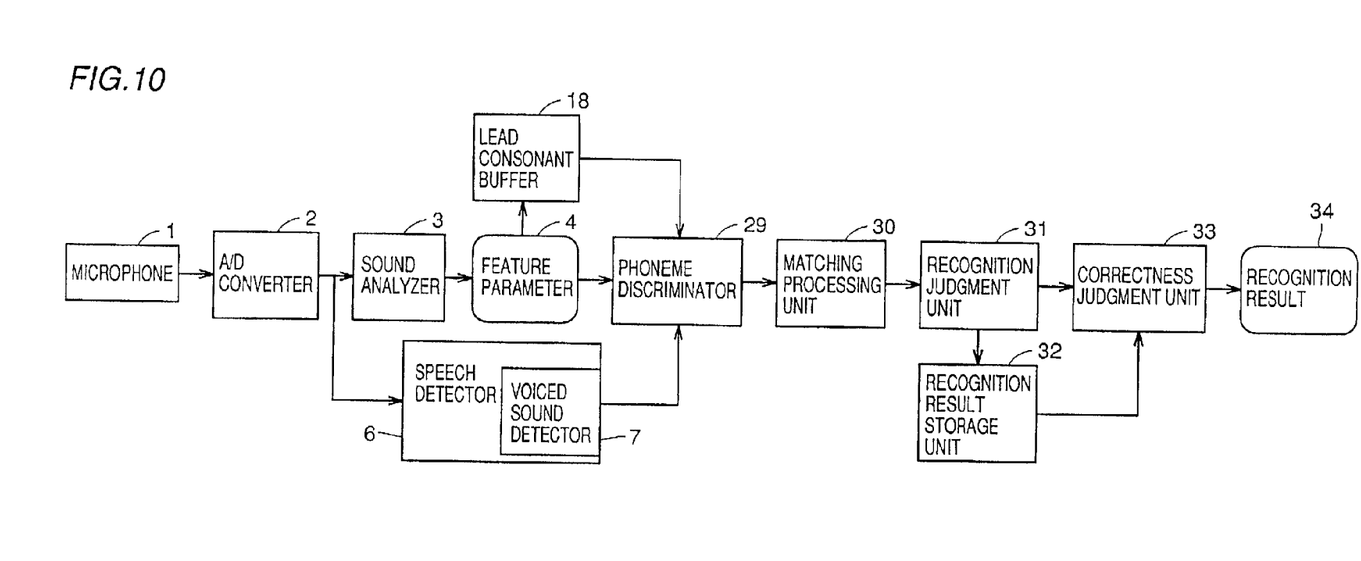
FIG. 10 is a block diagram representing a schematic configuration of a speech recognition apparatus in a fourth embodiment of the present invention.

FIG. 10 is a block diagram representing a schematic configuration of a speech recognition apparatus in the fourth embodiment of the present invention. The speech recognition apparatus includes: a microphone 1 converting a speech of a speaker to an analog, electrical signal; an A/D converter 2 converting the analog signal outputted from the microphone 1 to sound data of digital information; a sound analyzer 3 analyzing the sound data outputted from the A/D converter 2 to convert it to a feature parameter 4; an speech detector 6 detecting an interval of a speech using the sound data outputted from the A/D converter 2; a lead consonant buffer 18 storing feature parameters of frames equal to or longer than the longest lead consonant of a registered pattern; a phoneme discriminator 29 performing matching processing of a feature parameter 4 subsequent to a lead voiced sound with a registered data based on a detection result obtained by the speech detector 6 to discriminate between phonemes (a voiced sound from the others) and judge a consonant corresponding to a discriminated phoneme statistically; a matching processing unit 30 performing matching processing of registered data corresponding to the discriminated phoneme obtained by the phoneme discriminator 29 with a feature parameter of a lead consonant stored in the lead consonant buffer 18 and feature parameter 4 subsequent to a lead voiced sound; a recognition judgment unit 31 performing judgment on speech recognition based on a matching result obtained by the matching processing unit 30; a recognition result storage unit 32 storing a recognition result in the past; and an correctness judgment unit 33 judging whether or not a recognition result obtained by the recognition judgment unit 31 is correct referring to the recognition result in the past stored in the recognition result storage unit 32 to output a recognition result 34.

The speech detector 6 includes a voiced sound detector 7 detecting a voiced sound component of a speech using the sound data outputted from the A/D converter 2. The voiced sound detector 7 detects a voiced sound using a pitch extraction method such as a modified correlation method and a cepstrum method.

The sound analyzer 3 analyzes the sound data outputted from the A/D converter 2 to convert each frame as a unit of the sound data to a feature parameter 4. The lead consonant buffer 18 has a capacity as large as to be able to store feature parameters of frames equal to or longer than the longest lead consonant of a registered pattern.

Figure 11:
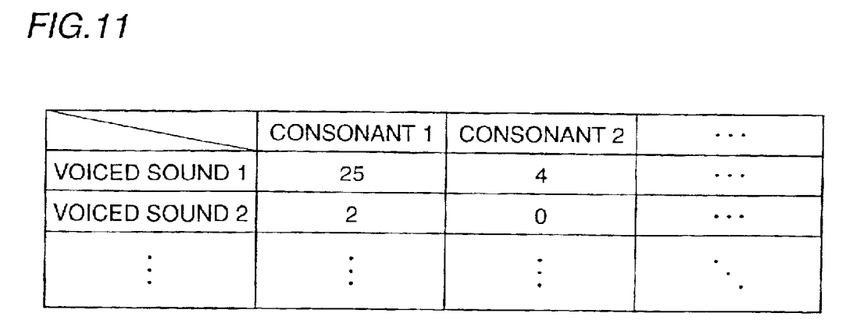
FIG. 11 is a table representing one example of statistical data of consonants organized by voiced sound.

The phoneme discriminator 29 performs matching processing of a feature parameter 4 subsequent to a lead voiced sound with registered data to discriminate among phonemes (a voiced sound from the others) when the lead voiced sound is detected by the voiced sound detector 7. The phoneme discriminator 29, as shown in FIG. 11, has statistical data (distribution information) of consonants organized by voiced sound as a table. In this table, as the statistical data, there may be stored information obtained in advance from practical experience or information obtained by counting discrimination results of consonants corresponding to voiced sounds actually obtained in the past. The phoneme discriminator 29 refers to the table to output consonants corresponding to a voiced sound discriminated by matching processing as phoneme candidates in statistically decreasing order of occurrence frequency. Note that the phoneme discriminator 29 may output discriminated phoneme information weighted using a coefficient according to a frequency of occurrence.

The matching processing unit 30 performs matching processing of registered data corresponding to phoneme information outputted from the phoneme discriminator 29 with a feature parameter corresponding to a lead consonant stored in the lead consonant buffer 18 and a feature parameter subsequent to a lead voiced sound to output a matching result to the recognition judgment unit 31. The recognition judgment unit 31 performs judgment on recognition of an input speech based on a matching result outputted from the matching processing unit 30.

The recognition result storage unit 32 stores recognition results judged by the recognition judgment unit 31 in the past. The correctness judgment unit 33 retrieves in the recognition result storage unit 32 to judge whether or not a judgment result by the recognition judgment unit 31 is correct. For example, a case is conceivable where the correctness judgment unit 33 judges that a judgment result is correct if a judgment result obtained by the recognition judgment unit 31 resides in the recognition result storage unit 32, while judging that a judgment result is not correct if the judgment result does not reside in the recognition result unit 32.

In a case where the correctness judgment unit 33 judges that a recognition result outputted from the recognition judgment unit 31 is not correct, a next candidate is selected among phoneme information pieces outputted from the phoneme discriminator 29 and the matching processing unit 30 performs matching processing on the selected phoneme information piece, followed by repetitions of the same procedure. Furthermore, when the correctness judgment unit 33 judges that no correct recognition result exists among candidates outputted from the phoneme discriminator 29, a recognition result of the highest possibility, for example of the closest analogy, is outputted as a recognition result 34 among recognition results stored in the recognition result storage unit 32.

Note that the sound analyzer 3, the speech detector 6, the voiced sound detector 7, the phoneme discriminator 29, the matching processing unit 30, the recognition judgment unit 31 and the correctness judgment unit 33 can also be realized by executing computer programs with a processor. The computer programs are provided to a user with a storage medium having the programs stored therein and speech recognition is performed according to the above described procedure by executing the programs with a general purpose use computer.

According to the speech recognition apparatus in the present embodiment, as described above, since a candidate of a lead consonant is discriminated statistically based on a lead voiced sound and matching processing is performed only on candidates, not only can a lead consonant be judged with good accuracy, but the number of matching processing times can also be reduced to improve a processing speed of speech recognition. Moreover, correctness of a current recognition result is judged using past recognition results and even when no correct recognition result is available, a recognition result of the highest possibility can be outputted.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A speech recognition apparatus comprising:
   a sound analyzer converting sound data to a feature parameter;
   a voiced sound detector detecting a lead voiced sound from said sound data;
   a lead consonant buffer storing a feature parameter preceding a lead voiced sound detected by said voiced sound detector as a feature parameter of a lead consonant; and
   a recognition processing section performing recognition processing referring to the feature parameter of the lead consonant stored in said lead consonant buffer.

2. The speech recognition apparatus according to claim 1, wherein said recognition processing section including:
   a matching processing unit performing matching processing of the feature parameter of the lead consonant stored in said lead consonant buffer with a feature parameter of a registered pattern; and
   a recognition judgment unit outputting a recognition result based on a matching result obtained by said matching processing unit.

3. The speech recognition apparatus according to claim 2, wherein said lead consonant buffer has a capacity as large as to store feature parameters of a fixed number of frames, and
   said matching processing unit includes a determination section performing matching processing of the feature parameter of the lead consonant stored in said lead consonant buffer with the feature parameter of the registered pattern while changing a start edge position for matching to determine the best start edge position.

4. The speech recognition apparatus according to claim 2, wherein said lead consonant buffer has a capacity as large as to store feature parameters of frames equal to or longer than the longest lead consonant of the registered pattern, and
   said matching processing unit includes a determination section performing matching processing of a feature pattern corresponding to a lead consonant length of the registered pattern among feature parameters stored in said lead consonant buffer with the feature parameter of the registered pattern while changing a start edge position for matching to determine the best start edge position.

5. The speech recognition apparatus according to claim 2, wherein said matching processing unit includes a processing section performing matching processing of the feature parameter of the lead consonant stored in said lead consonant buffer with the feature parameter of the registered pattern in a reverse direction on a time series.

6. The speech recognition apparatus according to claim 1, wherein said recognition processing section including:
   a first matching processing unit performing matching processing of a feature parameter subsequent to the lead voiced sound detected by said voiced sound detector with a feature parameter of a registered pattern;
   a first recognition judgment unit performing judgment on a lead consonant candidate based on a matching result obtained by said first matching processing unit;
   a second matching processing unit performing matching processing of the feature parameter of the lead consonant stored in said lead consonant buffer with a feature parameter of a registered pattern corresponding to the lead consonant candidate judged by said first recognition judgment unit; and
   a second recognition judgment unit outputting a recognition result based on a judgment result obtained by said first recognition judgment unit and a matching result obtained by said second matching processing unit.

7. The speech recognition apparatus according to claim 6, wherein said second recognition judgment unit includes an output section summing the judgment result obtained by said first recognition judgment unit and the matching result obtained by said second matching processing unit after being weighted to output a recognition result based on the summing result.

8. The speech recognition apparatus according to claim 6, wherein
   said lead consonant buffer has a capacity as large as to store feature parameters of frames equal to or longer than the longest lead consonant of the registered pattern, and
   said second matching processing unit includes a determination section performing matching processing of a feature pattern corresponding to a lead consonant length of the registered pattern among feature parameters stored in said lead consonant buffer with the feature parameter of the registered pattern while changing a start edge position for matching to determine the best start edge position.

9. The speech recognition apparatus according to claim 6, wherein said second matching processing unit includes a processing section performing matching processing of the feature parameter of the lead consonant stored in said lead consonant buffer with the feature parameter of the registered pattern in a reverse direction on a time series.

10. The speech recognition apparatus according to claim 1, wherein said recognition processing section includes:
    a phoneme discriminator performing matching processing of a feature parameter subsequent to the lead voiced sound detected by said voiced sound detector with a feature parameter of a registered pattern to discriminate a lead voiced sound judging a lead consonant corresponding to the discriminated lead voiced sound statistically and outputting a phoneme candidate;
    a matching processing unit performing matching processing of the feature parameter of the lead consonant stored in said lead consonant buffer with the feature parameter of the registered pattern corresponding to the phoneme candidate outputted from said phoneme discriminator;
    a recognition judgment unit outputting a recognition result based on a matching result obtained by said matching processing unit;
    a recognition result storage unit storing a speech recognition result in the past; and
    a correctness judgment unit judging on correctness of a recognition result obtained by said recognition judgment unit referring to the speech recognition result in the past stored in said recognition result storage unit.

11. The speech recognition apparatus according to claim 10,
    wherein said correctness judgment unit includes an output section selecting a recognition result from the speech recognition results in the past stored in said recognition result storage unit to output said selected recognition result when judging that no correct recognition result is available among the speech recognition results obtained by said recognition judgment unit.

12. The speech recognition apparatus according to claim 10, wherein said lead consonant buffer has a capacity as large as to store feature parameters of frames equal to or longer than the longest lead consonant of the registered pattern, and said matching processing unit includes a determination section performing matching processing of a feature pattern corresponding to a lead consonant length of the registered pattern among feature parameter stored in said lead consonant buffer with the feature parameter of the registered pattern while changing a start edge position for matching to determine the best start edge position.

13. The speech recognition apparatus according to claim 10, wherein said matching processing unit includes a processing section performing matching processing of the feature parameter of the lead consonant stored in said lead consonant buffer with the feature parameter of the registered pattern in a reverse direction on a time series.

14. A speech recognition method comprising the steps of:
converting sound data to a feature parameter;
detecting a lead voiced sound from said sound data;
storing a feature parameter preceding said lead voiced sound detected as a feature parameter of a lead consonant; and
performing recognition processing referring to the feature parameter of the lead consonant stored.

15. The speech recognition method according to claim 14, wherein said step of performing recognition processing includes the steps of:
performing matching processing of the feature parameter of the lead consonant stored with a feature parameter of a registered pattern; and
outputting a recognition result based on said matching result.

16. The speech recognition method according to claim 14, wherein said step of performing recognition processing include the steps of:
performing first matching processing of a feature parameter subsequent to said lead voiced sound detected with a feature parameter of a registered pattern;
judging a lead consonant candidate based on the matching result obtained by said first matching processing;
performing second matching processing of the feature parameter of the lead consonant stored with the feature parameter of the registered pattern corresponding to said lead consonant candidate judged; and
outputting a recognition result based on said lead consonant candidate judged and the matching result obtained by said second matching processing.

17. The speech recognition method according to claim 14, wherein said step of performing recognition processing includes the steps of:
performing matching processing of a feature parameter subsequent to said lead voiced sound detected with a feature parameter of a registered pattern to discriminate a lead voiced sound, judging a lead consonant corresponding to said discriminated lead voiced sound statistically and outputting a phoneme candidate;
performing matching processing of the feature parameter of said lead consonant stored with the feature parameter of the registered pattern corresponding to said phoneme candidate outputted;
outputting a recognition result based on said matching result;
storing a speech recognition result in the past; and
judging on correctness of said recognition result outputted referring to said recognition result in the past stored.

* * * * *